Dec. 30, 1952
I. COWLES
2,623,577
GAS WELDING AND CUTTING TIP
Filed June 27, 1946
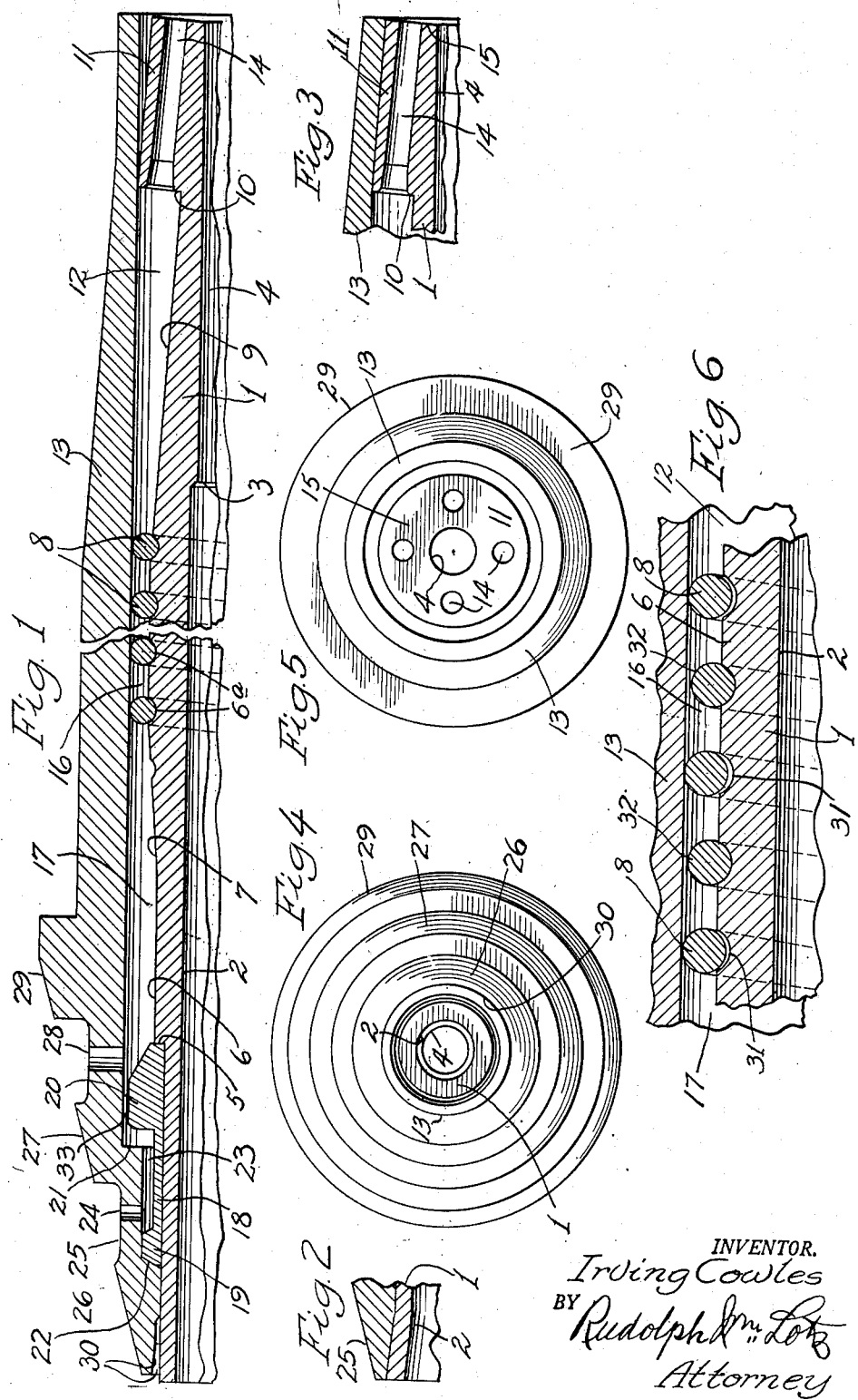
INVENTOR.
Irving Cowles
BY Rudolph M. Lot
Attorney Patented Dec. 30, 1952

2,623,577

UNITED STATES PATENT OFFICE 2,623,577

GAS WELDING AND CUTTING TIP

Irving Cowles, Chicago, Ill.

Application June 27, 1946, Serial No. 679,613

27 Claims. (Cl. 158—27.4)

This invention relates to improvements in gas discharge tips used in cutting and welding metals by use of an inflammable gas and oxygen, and has for its general object to provide a tip of this type which can be produced cheaply and accurately and which, aside from low production cost, presents specific advantages over prior art tips of the same general type, as pointed out particularly in the following specification.

In the accompanying drawings illustrating a tip constructed in accordance with the invention:

Fig. 1 is a fragmentary radial sectional view of the said tip with component parts thereof relatively positioned in readiness for permanent assembly.

Figs. 2 and 3 are views similar to Fig. 1 showing the end portions of the shell member of the tip contracted into fluid tight association with the core member thereof to complete the permanent assembly of the structure.

Fig. 4 is a view showing the left-hand end of the structure shown in Fig. 1 before the said end portion of the core member has been expanded, as shown in Fig. 2.

Fig. 5 is a view similar to Fig. 4 showing the right-hand end of Fig. 1 before the right-hand end portion of the shell member has been contracted, as shown in Fig. 3.

Fig. 6 is a fragmentary radial sectional view of a middle portion of the structure.

The tip comprises a core member 1 having a central longitudinal bore 2 extending from its intake end to the annular shoulder 3 which is spaced from the discharge end and connects, at said shoulder, with the smaller discharge end bore portion 4.

Said intake end portion is cylindrical externally to the annular shoulder 5 bordering a larger diameter portion 6 which extends to one end of a progressively enlarged diameter (tapered) portion 7. The latter terminates in a cylindrical portion which is equipped with a long pitch shallow helical groove of a depth about one-third or less than the diameter or gauge of the wire of which the helical spring 8, engaged in said groove, is composed.

From the other end of said grooved portion, said core member 1 presents a surface portion 7 which is of progressively increasing outer diameter (tapered) to the annularly enlarged cylindrical portion 16 which is equipped with a helical groove in which a helical wire 8 is engaged.

The outer tapered surface portion 9 of the member 1 extends from the portion 16 to the annular shoulder 10 of the enlarged discharge end portion 11 of said member 1 which is provided with a series of equally spaced discharge ducts 14.

The axes of the gas delivery ducts 14 intersect the axis of the bore portion 4 of the core member 1 at a predetermined point spaced from the latter.

The intake ends of said ducts 14 are flared and the outlet ends thereof are bordered by an annular surface 15 perpendicular to their axes.

The helice 8 cooperates with the opposed surface portion of the bore of the shell member 13 to provide a helical duct 16 connecting the annular fluid intake annular chamber 17 with the chamber 12. The flow capacity of the helical duct 16 is far greater than the total flow capacity of the ducts 14.

A sleeve 18 equipped with a shallow annular flange 19 at its outer end, and with a larger diameter flange 20 at its other end, is disposed telescopically over the intake end portion of the core member 1 in engaging relation to the shoulder 5, the shoulder engaging end of the flange 20 being beveled, and the inner end of said sleeve 20 abuts the shoulder 5 of core member 1.

The shell member 13 is equipped with a cylindrical bore from its right-hand extremity to the inner annular shoulder 21, the diameter of said bore being substantially equal to the diameter of the annular shoulder 19 of the core member 1.

From the shoulder 21 to the shoulder 22, the bore of the shell member 13 is of the diameter of the flange 19 of the sleeve 18 and abuts the outer end surface of the latter.

The said flange 20 of the sleeve 18 is of slightly smaller diameter than the bore of the shell member 13 to provide an annular passage through which gas which is fed into the annular space 23 between the flanges 19 and 20 and the portion of the sleeve 18 lying therebetween, may pass, said gas being fed through openings 24 in the sleeve member 13 from the annular space 25 lying between the outer annular flanges 26 and 27 of said sleeve member 13.

Openings 28 in the sleeve member 13, opposed to the beveled surface of the flange 20, connect the annular space between the annular flange 20 of the sleeve member 13 and the flange 27 thereof, with the annular space or chamber 17.

The sleeve member 13 is equipped with a flared mouth 30.

In assembling the structure, the helice 8 is first mounted upon the core member 1, said helice being of length determined by the length of the grooved cylindrical, substantially middle portion of the core member 1, the gauge of the wire of which the said helice is composed being such that the outer surface of the same contacts the opposed inner wall of the shell member 13.

The sleeve 18 is then mounted in place, and then the core member 1 is inserted into the sleeve member 13 to the position shown in Fig. 1.

The intake end portion of the core member 1 is then expanded suitably to effect fluid tight association of the core member 1 with the sleeve member 13 at this point, and also to prevent the withdrawal of the core member 1 from the said sleeve member 13. The other end portion of the latter is then contracted, by means of a well-known swaging die, into fluid tight association with the flange 11 of the core member 1 to complete the permanent fluid tight association of the latter with the sleeve member 13.

The thus completed assembly is then connected detachably with a conventional fitting having a flared mouth with which the tapered surface portions of the flanges 26, 27 and 29 of the structure are engaged fluid tightly for cooperation with said fitting to form annular chambers into which the gases to be supplied through the openings 24 and 28 are fed through valve controlled ducts of the said fitting, the latter being connected with the sources of supply of said gases, one such duct being arranged to supply oxygen to the duct of the core member 1.

Gas, such as acetylene, is fed through the openings 24, and oxygen is fed through openings 28, and also into the intake end of the core member 1.

It is most important that the flow of acetylene, or other inflammable gas, fed through the openings 24 in the sleeve member 13, be metered accurately, the same being fed under a constant pressure through said openings. It has been sought, heretofore, to accomplish this metering by resort to providing a number of said openings 24 of very small diameter, such as one-fiftieth of an inch.

In the instant structure, the flow control member or flange 20 of the sleeve 18 cooperates with the sleeve member 13 to provide an annular gas metering space 33, the flow capacity of which is less than the aggregate total flow capacity of the openings 24 which may, therefore, be of far larger diameter and fewer in number.

The helical duct 16 has a flow capacity as aforesaid less than the aggregate flow capacity of the said metering passage and said openings 28, but has a greater flow capacity than the total aggregate flow capacity of the discharge ducts 14. The duct 16 promotes intimate and thorough commingling of the gases as pointed out more particularly hereinafter.

The shape of the chamber 12 is important because the structure becomes very hot during use throughout the length of the flange 11 and along the adjacent portion of said chamber 12, which, because of the greater volume of its space, operates as an expansion chamber for the gases contained therein as they are heated prior to discharge through the ducts 14.

Said chamber 12 operates, also, in some degree, as a storage chamber wherein the gas pressure is maintained more uniformly than is usual because that pressure is not affected instantly by any of the usually slight changes in pressure of the fluids within the chamber 17.

The provision of the surface 15 and 10 perpendicular to the axes of said ducts 14 is important to guard against any deflection of the gas jets discharged therefrom from their predetermined course.

The structure is operated exactly the same as all other tips intended for the same purposes.

The helice 8 is shown in Fig. 1 as fitting closely the helical groove in which it is engaged and also in contact throughout its entire length with the bore of the sleeve member 13, whereas, in actual practice, this is neither practical nor desirable for several reasons, one being that such a close, snug fit is almost impossible of attainment, and if attained, would offer too much frictional resistance to insertion of the core member 1 into the sleeve member 13; the second reason being that it is preferable that said helice, which may be and is made of copper wire of gauge which will fit loosely in place to allow of some flow of fluids past the same while the main volume of gas is flowing through the helical duct which it defines.

Thus the leakage flow, as it may be termed, last above referred to, is of advantage in that it is lateral to or at an angle to the main flow and operates to promote commingling of the gases flowing through said duct.

In Fig. 6, it will be noted this leak flow space is irregular, being, in some instances, through unoccupied helical groove space and in other instances between the bore of the sleeve 13 and the said helix 8 as indicated at points 31 and 32, respectively, in Fig. 6.

Said duct 16 is believed to operate also to prevent back firing into the chamber 17 from the chamber 12, if such back firing should occur.

Production cost compared with that of other tips is reduced appreciably by decrease in the total number of operations required and the differences in length of the borings needed, as will be appreciated fully by those skilled in the art, an additional advantage being obtained with respect to accuracy of convergence of the ducts 14 to the axis of the discharge end portion of the bore of the core member 1.

I claim as my invention:

1. A nozzle piece for fluids comprising a shell member, a core member mounted within said shell member and bounding a flow chamber therebetween, said flow chamber having an upstream end and a downstream end, said shell member having provided therein a plurality of inlet means for a plurality of fluids, said inlet means being in communication with the flow chamber near the upstream end, helical means in a portion of the flow chamber for changing the direction of flow of a greater portion of the mixture of fluids to provide for better mixing within the flow chamber, and discharge means in communication with the downstream end of the flow chamber.

2. A nozzle piece for fluids comprising a shell member, a core member mounted within said shell member and bounding a flow chamber therebetween, said flow chamber being elongated and having an upstream end and a downstream end, said shell member having provided therein a plurality of inlet means for a plurality of fluids, said inlet means being in communication with the flow chamber near the upstream end, means on the core member positioned in the flow chamber downstream of the fluid inlet means for accelerating the mixture of fluids as the fluids flow longitudinally through said flow chamber, helical means in the flow chamber for changing the longitudinal direction of flow of a greater portion of the accelerated mixture of fluids to provide for better mixing within the flow chamber, means for redirecting the flow of the fluid mixture into a longitudinal direction in the flow chamber, and discharge means in communication with the downstream end of the flow chamber.

3. A nozzle piece for fluids comprising a shell member, a core member mounted within said shell member and bounding a flow chamber therebetween, said flow chamber being elongated and having an upstream end and a downstream end, said shell member having provided therein a plurality of inlet means for a plurality of fluids, said inlet means being in communication with the flow chamber at a region near the upstream end, one inlet means communicating with the flow chamber at a region further downstream than the other inlet means, means mounted in said flow chamber for regulating the flow of fluid, said means comprising members mounted on said core member and positioned between successive regions of communication of the plurality of inlet means with the flow chamber, helical means in a portion of the flow chamber for changing the longitudinal direction of flow of a portion of the mixture of fluids to provide for better mixing within the flow chamber, said helical means for changing the longitudinal direction of flow comprising the core member having a helical groove in its surface, and a helical member adapted to fit in said helical groove, the core member and shell member being spaced from each other so that the helical member bounds substantially longitudinal passageways between it and the bounding walls of the flow channel, and said helical member being restrained in the helical groove when in the final assembled position.

4. A nozzle piece for fluids comprising a shell member, a core member mounted within said shell member and bounding a flow chamber therebetween, said flow chamber being elongated and having an upstream end and a downstream end, said shell member having provided therein a plurality of inlet means for a plurality of fluids, said inlet means being in communication with the flow chamber at a region near the upstream end, one inlet means communicating with the flow chamber at a region further downstream than the other inlet means, means mounted in said flow chamber for regulating the flow of fluid, said means comprising members mounted on said core member and positioned between successive regions of communication of the plurality of inlet means with the flow chamber, helical means in a portion of the flow chamber for changing the longitudinal direction of flow of a greater portion of the mixture of fluids to provide for better mixing within the flow chamber, discharge means in communication with the downstream end of the flow chamber, said discharge means comprising a discharge flange mounted on said core member and bounding the downstream end of said flow chamber, said discharge flange having a plurality of discharge ducts therethrough, the axes of said ducts converging at a point spaced downstream from the discharge flange on said core member, and the faces of the discharge flange being substantially at right angles to the axes of said discharge ducts.

5. A nozzle piece for fluids comprising a shell member, a core member mounted within said shell member and bounding a flow chamber therebetween, said flow chamber being elongated and having an upstream end and a downstream end, said shell member having provided therein a pair of inlet means for a plurality of fluids, the first inlet means being in communication with the flow chamber at a region near the upstream end, the second inlet means communicating with the flow chamber at a region downstream from the first inlet means, means mounted in said flow chamber for regulating the flow of fluid, said means comprising a flow controlling member mounted on said core member and positioned within the flow chamber between the successive regions of communication of the pair of inlet means with the flow chamber, means downstream of the flow-controlling member for accelerating the mixture of fluids as the fluids flow longitudinally through said flow chamber, helical means in the flow chamber for changing the longitudinal direction of flow of a greater portion of the accelerated mixture of fluids to provide for better mixing within the flow chamber, means downstream of said helical means for redirecting the flow of fluid-mixture into a longitudinal direction in the flow chamber and for decelerating the mixture of fluids, and discharge means in communication with the downstream end of the flow chamber.

6. A nozzle piece for fluids comprising a shell member, a core member, said core member and shell member both being bodies of revolution concentrically with the core member within the shell member and bounding an elongated annular flow chamber therebetween, said core member having an axial passageway therethrough, said annular flow chamber having an upstream end and a downstream end, said shell member having provided therein a first fluid inlet means in communication with the flow chamber near the upstream end, a second fluid inlet means communicating with the flow chamber at a region downstream of the first inlet means, fluid-flow controlling means mounted on said core member in the flow chamber between the first fluid inlet means and the second fluid inlet means, said flow chamber being bounded at the downstream end by an annular discharge flange mounted on the end of said core member and in sealing engagement with said shell member, said annular discharge flange having a plurality of discharge ducts therethrough in communication with the downstream end of said flow chamber, the axes of said discharge ducts intersecting the axis of said core member at a point spaced downstream from the downstream end of said core member, and the faces of the annular discharge flange being substantially at right angles to the axes of said convergent discharge ducts.

7. A nozzle piece for fluids comprising a shell member, a core member, said core member and shell member both being bodies of revolution positioned concentrically with the core member within the shell member and bounding an elongated annular flow chamber therebetween, said core member having an axial passageway therethrough, said annular flow chamber having an upstream end and a downstream end, said shell member having provided therein a first fluid inlet means in communication with the flow chamber near the upstream end, a second fluid inlet means communicating with the flow chamber at a region downstream of the first inlet means, fluid-flow controlling means mounted on said core member in the flow chamber between the first fluid inlet means and the second fluid inlet means, a portion of the annular flow chamber downstream of the flow controlling means being substantially a helical duct in which a greater portion of the fluid mixture is caused to flow in a helical path, and fluid discharge means in communication with the downstream end of the annular flow chamber.

8. A nozzle piece for fluids comprising a shell member, a core member, said core member and shell member both being bodies of revolution positioned concentrically with the core member within the shell member and bounding an elongated annular flow chamber therebetween, said core member having an axial passageway therethrough, said annular flow chamber having an upstream end and a downstream end, said shell member having provided therein a first fluid inlet means in communication with the flow chamber near the upstream end, a second fluid inlet means communicating with the flow chamber at a region downstream of the first inlet means, fluid-flow controlling means mounted on said core member in the flow chamber between the first fluid inlet means and the second fluid inlet means, that part of the annular flow chamber downstream of the flow controlling means being a mixing region comprising in the direction passing downstream a longitudinal flow section of lessening flow area, a region of reduced flow area in which is positioned helical means for causing a greater portion of the mixture of fluids to flow in a helical path, and a region of increasing flow area in which the direction of flow is longitudinal, and fluid discharge means in communication with the downstream end of the annular flow chamber.

9. A nozzle piece for fluids comprising a shell member, a core member mounted within said shell member and bounding a flow chamber therebetween, said flow chamber having an upstream end and a downstream end, said shell member having provided therein a first fluid inlet means in communication with the flow chamber near its upstream end, a second fluid inlet means communicating with the flow chamber at a region downstream of the first inlet means, fluid flow controlling means mounted on the core member at a region downstream of the first inlet means and upstream of the second inlet means, a portion of the flow chamber downstream of the flow controlling means being substantially a helical duct in which a portion of the fluid mixture is caused to flow in a helical path, and discharge means bounding the downstream end of the flow chamber.

10. A nozzle piece for fluids comprising a shell member, a core member mounted within said shell member and bounding a flow chamber therebetween, said flow chamber having an upstream end and a downstream end, said shell member having provided therein a first fluid inlet means in communication with the flow chamber near its upstream end, a second fluid inlet means communicating with the flow chamber at a region downstream of the first inlet means, fluid flow controlling means mounted on the core member and positioned within the flow chamber at a region downstream of the first inlet means and upstream of the second inlet means, a portion of the flow chamber downstream of the flow controlling means being substantially a helical duct region of reduced flow area in which a greater portion of the fluid mixture is caused to flow in a helical path, and discharge means bounding the downstream end of the flow chamber.

11. A nozzle piece for fluids comprising a shell member, a core member mounted within said shell member and bounding a flow chamber therebetween, said flow chamber having an upstream end and a downstream end, said shell member having provided therein a first fluid inlet means in communication with the flow chamber near its upstream end, a second fluid inlet means communicating with the flow chamber at a region downstream of the first inlet means, fluid flow controlling means mounted on the core member positioned within the flow chamber at a region downstream of the first inlet means and upstream of the second inlet means, a portion of the flow chamber downstream of the flow controlling means being substantially a helical duct region in which a greater portion of the fluid mixture is caused to flow in a helical path, and discharge means bounding the downstream end of the flow chamber, the total flow capacity through said helical duct being greater than the total flow capacity of the discharge means.

12. A nozzle piece for fluids comprising a shell member, a core member mounted within said shell member and bounding a flow chamber therebetween, said flow chamber having an upstream end and a downstream end, said shell member having provided therein a first fluid inlet means in communication with the flow chamber near its upstream end, a second fluid inlet means communicating with the flow chamber at a region downstream of the first inlet means, fluid flow controlling means mounted on the core member and positioned within the flow chamber at a region downstream of the first inlet means and upstream of the second inlet means, a portion of the flow chamber downstream of the flow controlling means having positioned therein helical means for causing a portion of the mixture of fluids to flow in a helical path, said helical means being positioned between the core member and the shell member so as to form passageways therebetween which permit the remaining portion of the fluid mixture to pass in a substantially longitudinal direction through said passageways between said helical means and the bounding walls of the flow chamber, and discharge means bounding the downstream end of the flow chamber.

13. A nozzle piece for fluids comprising a shell member, a core member mounted within said shell member and bounding a flow chamber therebetween, said flow chamber having an upstream end and a downstream end, said shell member having provided therein a first fluid inlet means in communication with the flow chamber near its upstream end, a second fluid inlet means communicating with the flow chamber at a region downstream of the first inlet means, fluid flow controlling means mounted on the core member and positioned within the flow chamber at a region downstream of the first inlet means and upstream of the second inlet means, that part of the flow chamber downstream of the flow controlling means being a mixing region comprising in the direction passing downstream a longitudinal flow section of lessening flow area, a helical duct region of reduced flow area in which a greater portion of the mixture of fluids is caused to flow in a helical path, and a region of increasing flow area in which the flow is longitudinal, and discharge means bounding the downstream end of the flow chamber.

14. A nozzle piece for fluids comprising a shell member, a core member mounted within said shell member and bounding a flow chamber therebetween, said flow chamber having an upstream end and a downstream end, said shell member having provided therein a first fluid inlet means in communication with the flow chamber near its upstream end, a second fluid inlet means communicating with the flow chamber at a region downstream of the first inlet means, fluid flow controlling means mounted on the core member and positioned within the flow chamber at a region downstream of the first inlet means and upstream of the second inlet means, that part of the flow chamber downstream of the flow controlling means being a mixing region comprising in the direction passing downstream a longitudinal flow section of lessening flow area, a region of reduced flow area in which is positioned helical means for causing a greater portion of the mixture of fluids to flow in a helical path, and a region of increasing flow area in which the direction of flow is longitudinal, means for retaining said helical means in position in the flow chamber, and discharge means bounding the downstream end of the flow chamber.

15. A nozzle piece for fluids comprising a shell member, a core member mounted within said shell member and bounding a flow chamber therebetween, said flow chamber having an upstream end and a downstream end, said shell member having provided therein a first fluid inlet means in communication with the flow chamber near its upstream end, a second fluid inlet means communicating with the flow chamber at a region downstream of the first inlet means, fluid flow controlling means mounted on the core member and positioned within the flow chamber at a region downstream of the first inlet means and upstream of the second inlet means, that part of the flow chamber downstream of the flow controlling means being a mixing region comprising in the direction passing downstream a longitudinal flow section of lessening flow area, a region of reduced flow area in which is positioned helical means for causing a portion of the mixture of fluids to flow in a helical path, and a region of increasing flow area in which the direction of flow is longitudinal; means for retaining said helical means in position in the flow chamber, said helical means being positioned between the core member and the shell member so as to form passageways therebetween which permit the remaining portion of the fluid mixture to pass in a substantially longitudinal direction through said passageways between said helical means and the bounding walls of the flow chamber, and discharge means bounding the downstream end of the flow chamber.

16. A nozzle piece for fluids comprising a shell member, a core member mounted within said shell member and bounding a flow chamber therebetween, said flow chamber having an upstream end and a downstream end, said shell member having provided therein a first fluid inlet means in communication with the flow chamber near its upstream end, a second fluid inlet means communicating with the flow chamber at a region downstream of the first inlet means, fluid flow controlling means mounted on the core member and positioned between the first inlet means and the second inlet means, a portion of the flow chamber downstream of the flow controlling means being substantially a helical duct in which a portion of the fluid mixture is caused to flow in a helical path, said flow chamber being bounded at the downstream end by a discharge flange mounted on said core member and in sealing engagement with said shell member, said discharge flange having a plurality of discharge ducts therethrough in communication with the downstream end of said flow chamber, and the axes of said ducts converging at a point spaced downstream from the discharge flange on said core member.

17. A nozzle piece for fluids comprising a shell member, a core member mounted within said shell member and bounding a flow chamber therebetween, said flow chamber having an upstream end and a downstream end, said shell member having provided therein a first fluid inlet means in communication with the flow chamber near its upstream end, a second fluid inlet means communicating with the flow chamber at a region downstream of the first inlet means, fluid flow controlling means mounted on the core member and positioned between the first inlet means and the second inlet means, a portion of the flow chamber downstream of the flow controlling means being substantially a helical duct in which a portion of the fluid mixture is caused to flow in a helical path, said flow chamber being bounded at the downstream end by a discharge flange mounted on said core member and in sealing engagement with said shell member, said discharge flange having a plurality of discharge ducts therethrough in communication with the downstream end of said flow chamber, the axes of said ducts converging at a point spaced downstream from the discharge flange on said core member, and the faces of the discharge flange being substantially at right angles to the axes of said discharge ducts.

18. A nozzle piece for fluids comprising a shell member, a core member mounted within said shell member and bounding a flow chamber therebetween, said flow chamber having an upstream end and a downstream end, said shell member having provided therein a first fluid inlet means in communication with the flow chamber near its upstream end, a second fluid inlet means communicating with the flow chamber at a region downstream of the first inlet means, a sleeve having a fluid flow controlling flange thereon mounted on the core member, said flange projecting into the flow chamber at a region downstream of the first inlet means and upstream of the second inlet means, said flange being spaced from the shell member so as to form a connecting passageway communicating that part of the flow chamber in direct communication with the first inlet means and that part of the flow chamber in direct communication with the second inlet means, that part of the flow chamber downstream of the flow controlling flange being a mixing chamber comprising in the direction passing downstream a region of lessening flow area, a region of least flow area, and region of increasing flow area, said flow chamber being bounded at the downstream end by a discharge flange mounted on said core member and in sealing engagement with said shell member, said discharge flange having a plurality of discharge ducts therethrough in communication with the downstream end of said flow chamber, the axes of said ducts converging at a point spaced downstream from the discharge flange on said core member, and the faces of the discharge flange being substantially at right angles to the axes of said discharge ducts.

19. A structure of the type specified comprising a tubular core member equipped at its discharge end with an external annular flange, said flange having a plurality of ducts therethrough, the axes of said ducts converging to intersect the axis of said core member at a point spaced from the discharge end of the core member, a shell member rigid with said core member, said core member and shell member having an annular chamber therebetween, said shell member being provided at its inlet end with a pair of spaced fluid intake means in communication with the annular chamber, and a fluid-flow controlling member disposed within the chamber between the core member and the shell member at a region between said pair of spaced fluid intake means.

20. A structure, according to claim 19, wherein a helical member is positioned in said annular chamber cooperating with said core member and said shell member to form a helical duct in a portion of the chamber between the ends of said chamber, and the flow capacity of said helical duct being greater than the total aggregate flow capacity of said discharge ducts in the said external annular flange.

21. A structure of the type specified which comprises an elongated core member equipped with a longitudinal bore therethrough, said core member having an external flange at its discharge end, said flange having a plurality of gas discharge ducts axially convergent to intersect the axis of the longitudinal bore at a point spaced from the discharge end of the core member, a shell member rigidly mounted upon said core member at its ends and spaced therefrom between its ends so as to form an elongated and annular flow chamber between the shell member and the core member, said shell member being provided at the inlet end with a pair of fluid inlet means in communication with said flow chamber, said core member being enlarged so that the cross-sectional area of the core at a region between the ends of the core is increased so as to lessen the spacing between the shell member and the core member, said reduced spacing between the core member and shell member providing a restricted passage for fluid in the flow chamber from the intake means through the shell member to said convergent discharge ducts, said restricted passage being of greater cross-sectional area than said convergent discharge ducts and of less cross-sectional area than the cross-sectional area of the annular flow chamber between the core and shell members at any point between said restricted passage and said external flange.

22. A structure of the type specified comprising an elongated core member equipped with a longitudinal bore therethrough, said core member being enlarged at a region between its ends, said core having at its discharge end an external annular flange having a plurality of fluid discharge ducts therethrough, a shell member rigidly secured at one end to said external flange and at the other end to said core member, said shell member having a plurality of fluid intake means therein adjacent the fluid intake end of the flow chamber, a fluid flow restricting member mounted on said core member and positioned in said flow chamber between the fluid intake means, and said fluid-flow restricting member substantially dividing said flow chamber into a plurality of connected fluid receiving chambers.

23. A structure, according to claim 22, wherein a helical member is mounted in said flow chamber adjacent the enlarged portion of said core member and cooperates with said shell member and said core member to form a helical duct in a portion of the flow chamber between the ends of said chamber, and said helical duct being of greater flow capacity than said fluid discharge ducts in the external annular flange of said core member.

24. A nozzle piece for fluids, comprising a shell member, a core member mounted within said shell member and bounding an interspace therebetween, said interspace having an upstream end and a downstream end, said shell member having provided therein a first fluid inlet means in communication with the interspace near its upstream end, a second fluid inlet means communicating with the interspace at a region downstream of the first inlet means, fluid flow controlling means occupying said interspace at a region downstream of the first inlet means and upstream of the second inlet means, a portion of the interspace downstream of the flow controlling means being substantially a helical duct in which a portion of the fluid mixture is caused to flow in a helical path, and discharge means bounding the downstream end of the interspace.

25. A nozzle piece for fluids, comprising a shell member, a core member mounted within and spaced from said shell member, the spaced surfaces of said core member and shell member bounding a flow chamber therebetween, said flow chamber having an upstream end and a downstream end, said shell member having provided therein a plurality of inlet means for a plurality of fluids, said inlet means being in communication with the flow chamber near the upstream end, helical means in a portion of the flow chamber for changing the longitudinal direction of flow of a portion of the mixture of fluids to provide for better mixing within the flow chamber, said helical means for changing the longitudinal direction of flow comprising a helical groove in one of said spaced surfaces bounding said flow chamber, and a helical member adapted to be positioned in said helical groove, said helical member bounding substantially longitudinal passageways between it and said bounding walls of the flow chamber.

26. A nozzle piece for fluids, comprising a shell member, a core member mounted within said shell member and bounding a flow chamber therebetween, said flow chamber having an upstream end and a downstream end, said shell member having provided therein a plurality of inlet means for a plurality of fluids, said inlet means being in communication with the flow chamber near the upstream end, and discharge means in communication with the downstream end of the flow chamber, said discharge means comprising a discharge flange mounted on said core member and bounding the downstream end of said flow chamber, said discharge flange having a plurality of discharge ducts therethrough, the axes of said ducts converging at a point spaced downstream from said discharge flange, and the faces of the discharge flange being substantially at right angles to the axes of said discharge ducts.

27. A nozzle piece for fluids, comprising a shell member, a core member mounted within said shell member and bounding an annular interspace therebetween, said interspace having an upstream end and a downstream end, said shell member having a first and a second fluid intake means therein, said second fluid intake means being spaced downstream of the first fluid intake means, said second intake means communicating directly with said annular interspace, a fluid flow restricting member positioned in said interspace at a point between said first and second fluid intake means for restricting the volume flow of fluid from said first intake means into the portion of said interspace, downstream of said flow restricting member, wherein the fluids carried by said first and second fluid intake means are mixed.

IRVING COWLES.

REFERENCES CITED

The following references are of record in the file of this patent:

UNITED STATES PATENTS

| Number | Name | Date |
|---|---|---|
| 629,338 | Chelmisky | July 25, 1899 |
| 1,365,600 | Peir et al. | Jan. 11, 1921 |
| 1,369,545 | Reynolds | Feb. 22, 1921 |
| 1,373,829 | Perdue | Apr. 5, 1921 |
| 1,420,921 | Godfrey | June 27, 1922 |
| 1,483,467 | Meden | Feb. 12, 1924 |
| 1,631,007 | Bucknam | May 31, 1927 |
| 2,258,340 | Smith | Oct. 7, 1941 |
| 2,376,413 | Babcock | May 22, 1945 |